(12) United States Patent
Shi et al.

(10) Patent No.: US 10,067,999 B2
(45) Date of Patent: Sep. 4, 2018

(54) HIGH-PERFORMANCE DATABASE REPLICATION SYSTEMS AND METHODS

(71) Applicant: VoltDB, Inc., Bedford, MA (US)

(72) Inventors: Ning Shi, Acton, MA (US); Walter Weiss, Chelmsford, MA (US); Yang Lu, Woburn, MA (US); Rui Shen, Burlington, MA (US); Manju James, Lexington, MA (US)

(73) Assignee: VoltDB, Inc., Bedford, MA (US)

( * ) Notice: Subject to any disclaimer, the term of this patent is extended or adjusted under 35 U.S.C. 154(b) by 0 days.

(21) Appl. No.: 15/704,414

(22) Filed: Sep. 14, 2017

(65) Prior Publication Data
US 2018/0101589 A1   Apr. 12, 2018

Related U.S. Application Data

(60) Provisional application No. 62/406,612, filed on Oct. 11, 2016.

(51) Int. Cl.
*G06F 17/30* (2006.01)

(52) U.S. Cl.
CPC .. *G06F 17/30578* (2013.01); *G06F 17/30368* (2013.01)

(58) Field of Classification Search
CPC ................. G06F 17/30368; G06F 17/30578
See application file for complete search history.

(56) References Cited

U.S. PATENT DOCUMENTS

| 2011/0320403 A1* | 12/2011 | O'Krafka | G06F 17/30578 |
| | | | 707/620 |
| 2016/0105370 A1* | 4/2016 | Mellor | H04L 45/02 |
| | | | 709/226 |

\* cited by examiner

*Primary Examiner* — Dinku Gebresenbet
(74) *Attorney, Agent, or Firm* — Goodwin Procter LLP

(57) ABSTRACT

Database replication is performed by tracking sequence numbers associated with binary change logs. At a producer cluster, a binary change log is generated based on a write transaction made to a database partition in the producer cluster. Included with the binary change log is a sequence number corresponding to the write transaction. The binary change log is transmitted from the producer cluster to a consumer cluster, where a determination is made whether to apply the binary change log based on the included sequence number. The binary change log is then applied to a database partition in the consumer cluster. The sequence number is stored at the consumer cluster by combining the sequence number with a numerical range having a first number and a second number, where the second number has a value corresponding to the most recent binary change log applied to the database partition in the consumer cluster.

16 Claims, 3 Drawing Sheets

HIGH-PERFORMANCE DATABASE REPLICATION SYSTEMS AND METHODS

CROSS-REFERENCE TO RELATED APPLICATION

This application claims priority to and the benefit of U.S. Provisional Patent Application No. 62/406,612, filed on Oct. 11, 2016, and entitled "High-Performance Database Replication Systems and Methods," the entirety of which is incorporated by reference herein.

TECHNICAL FIELD

The present disclosure relates generally to electronic databases and, more particularly, to systems and methods for binary-log-based database replication using sequence number tracking.

BACKGROUND

Database replication involves the copying of data operations from a source database to a destination database, and can include periodic snapshotting as well as continuous replication through data streams. Replication helps protect a database cluster against the failure of an entire cluster, as data can be recovered and operations can continue using a failover cluster that has maintained a replica of the data on the failed cluster. However, with database implementations of increasing scale, including geographically distributed databases having many clusters, it is important to ensure that database replication is implemented as efficiently as possible. Data operations must be timely replicated and not use more resources than necessary, so that any replicas are up-to-date and available in the event of cluster failure.

BRIEF SUMMARY

Disclosed herein are various implementations of systems and methods for performing database replication using tracked sequence numbers associated with binary change logs. At a producer cluster, a binary change log is generated based on a write transaction made to a database partition in the producer cluster. Included with the binary change log is a sequence number corresponding to the write transaction. The binary change log is transmitted from the producer cluster to a consumer cluster, where a determination is made whether to apply the binary change log based on the included sequence number. The binary change log is then applied to a database partition in the consumer cluster. The sequence number is stored at the consumer cluster by combining the sequence number with a numerical range having a first number and a second number, where the second number has a value corresponding to the most recent binary change log applied to the database partition in the consumer cluster. Other aspects of the foregoing include corresponding systems and computer-executable instructions stored on non-transitory storage media.

In one implementation, as part of including a sequence number with the binary change log, the previous number associated with the database partition in the producer cluster is increased. Further, the determination of whether to apply the binary change log can include determining, based on the sequence number included with the binary change log, whether the binary change log has already been applied to the database partition in the consumer cluster.

Combining the sequence number with the numerical range includes, in one implementation, determining that the sequence number consecutively follows the second number and replacing the second number with the sequence number, and, in another implementation, determining that the sequence number does not consecutively follow the second number and storing, at the consumer cluster, a second numerical range comprising the sequence number.

The first number can be a value corresponding to an earliest binary change log applied to the database partition in the consumer cluster. The first number can also be a value indicating that all binary change logs, from an earliest binary change log created for the database partition in the producer cluster to the most recent binary change log, have been applied to the database partition in the consumer cluster.

In a further implementation, for each database partition in a plurality of database partitions in the consumer cluster, a numerical range of sequence numbers representing binary change logs applied to the respective database partition is received. Based on these received numerical ranges, a determination is made which binary change logs were applied to the consumer cluster. The consumer cluster then sends a request to the producer cluster for one or more binary change logs that were not applied to one or more database partitions in the consumer cluster.

In yet another implementation, the producer cluster takes the form of a first topology and the consumer cluster takes the form of a second, different topology. A plurality of binary change logs associated with a first database partition in the producer cluster are received at the consumer cluster, with each of the binary change logs including a different sequence number. The binary change logs are applied to a plurality of database partitions in the consumer cluster, and for each applied binary change log, the sequence number for that binary change log is stored, at the consumer cluster, in a respective numerical range associated with the database partition in the consumer cluster to which that binary change log was applied.

Further, the numerical ranges associated with the database partitions in the consumer cluster can be received and merged to form at least one merged numerical range representing the plurality of binary change logs applied to the database partitions. Based on the at least one merged numerical range, sequence numbers and corresponding binary logs that are missing with respect to the first database partition in the producer cluster can be identified.

The details of one or more implementations of the subject matter described in the present specification are set forth in the accompanying drawings and the description below. Other features, aspects, and advantages of the subject matter will become apparent from the description, the drawings, and the claims to persons of ordinary skill in the art and are considered to be within the scope of this disclosure.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Described herein are methods and various systems for binary-log-based database replication using sequence number tracking. In one implementation, the techniques described herein are implemented using a fully ACID, scalable, relational database with a shared-nothing architecture, in which there is no single point of failure. The system can include a high-performance database replication (DR) feature that is able to interpret ACID transaction semantics and supports geographically distributed applications. The DR capability provided by the present system can replicate data changes (e.g., inserts, updates, deletes, truncations, etc.) by distributing binary change logs among remotely located databases and applying the changes transactionally. DR provides various advantages, such as enhanced fault tolerance and disaster recovery by having available failover nodes when one or more clusters fail.

Figure 1:
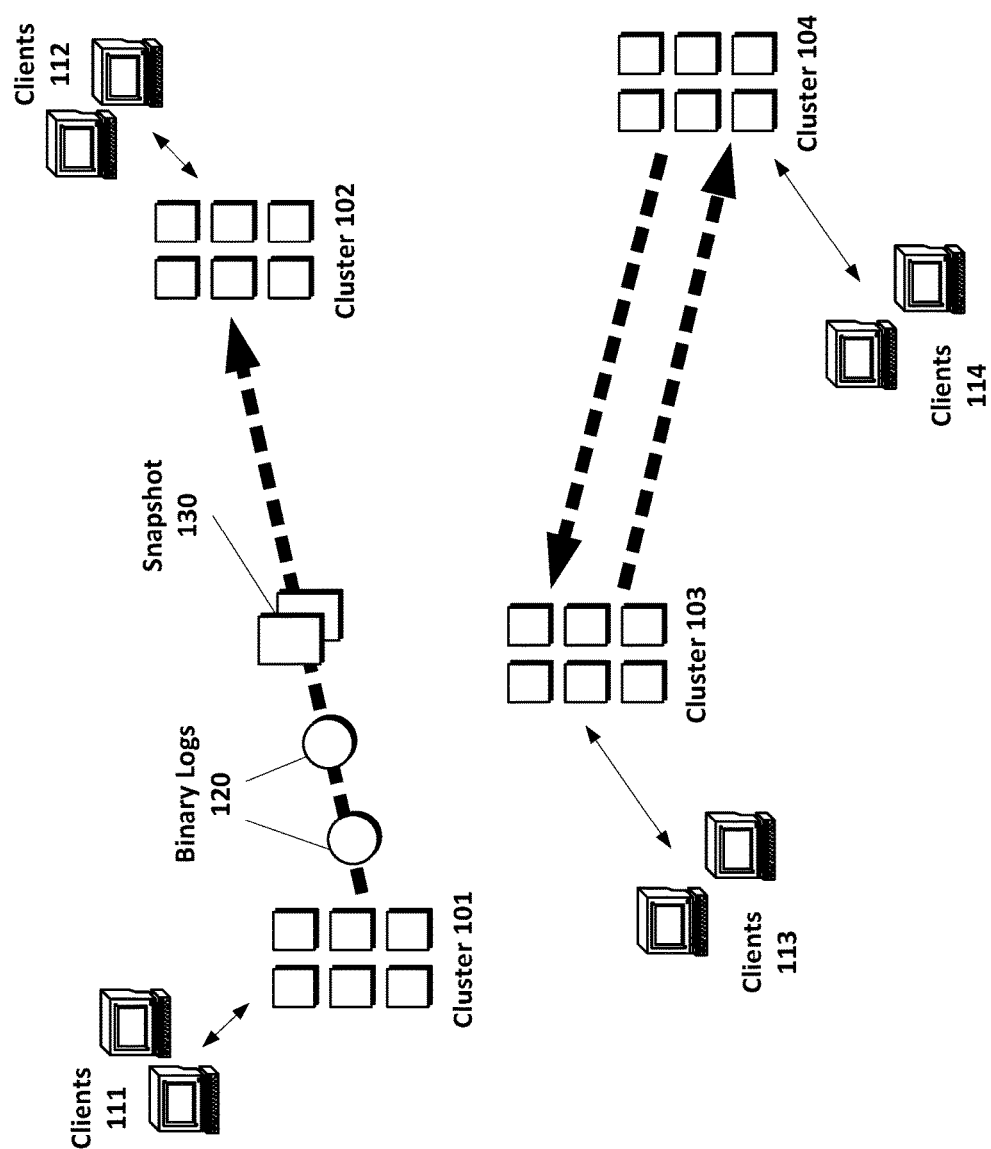
FIG. 1 depicts an example architecture of a geographically distributed database implementing database replication.

FIG. 1 depicts a geographically distributed database including clusters 101-104 and corresponding client systems 111-114. Using the database in FIG. 1 as a visual example, DR can performed one-way (passive) or two-way (cross datacenter). Passive DR copies the contents from one database, referred to as the master, to another database, referred to as the replica. In passive DR, replication occurs in one direction: from the master to the replica. In FIG. 1, passive DR occurs by replicating data from producer cluster 101 (master) to consumer cluster 102 (replica). Applications executing on client systems 111 can connect to the master database on cluster 101 and perform normal database operations, including INSERT, UPDATE, and DELETE statements, and changes are copied using binary change logs 120 from the master, cluster 101, to the replica, cluster 102, where they are accessible to client systems 112. If data already exists in cluster 102 before database replication starts for the first time, cluster 101 can send a snapshot 130 of the existing data to cluster 102. Once the snapshot is received and applied (and the two clusters 101 and 102 are in sync), binary logs 120 of transaction results are sent to keep the clusters 101 and 102 synchronized. To ensure consistency between the two databases on clusters 101 and 102, the replica cluster 102 can be initialized as a read-only database, where only transactions replicated from the master cluster 101 can modify the database contents. Cross datacenter replication (XDCR), or active replication, copies changes in both directions. In FIG. 1, copies are replicated in both directions between cluster 103 and cluster 104. Client applications on client systems 113 and 114 can perform read/write operations on their respective cluster 103 and 104, and changes in one database are then copied and applied to the other database (i.e., cluster 103 to cluster 104, and vice-versa).

DR is not instantaneous; rather, transactions are committed locally and then copied to other databases. The replication process can be performed in multiple parallel streams, with each unique database partition in one cluster sending a binary log of completed transactions to one or more other clusters. Replicating by partition has two key advantages: speed and durability. Because DR uses a binary log of the results of the transaction (rather than the transaction itself), the receiving cluster (or consumer) does not need to reprocess the transaction; it simply applies the results. Also, since each partition replicates autonomously, multiple streams of data are processed in parallel, significantly increasing throughout. Moreover, in a K-safe environment, if a server fails on either cluster, individual partition streams can be redirected to other nodes or a stream can wait for the server to rejoin, without interfering with the replication of the other partitions.

Figure 2:
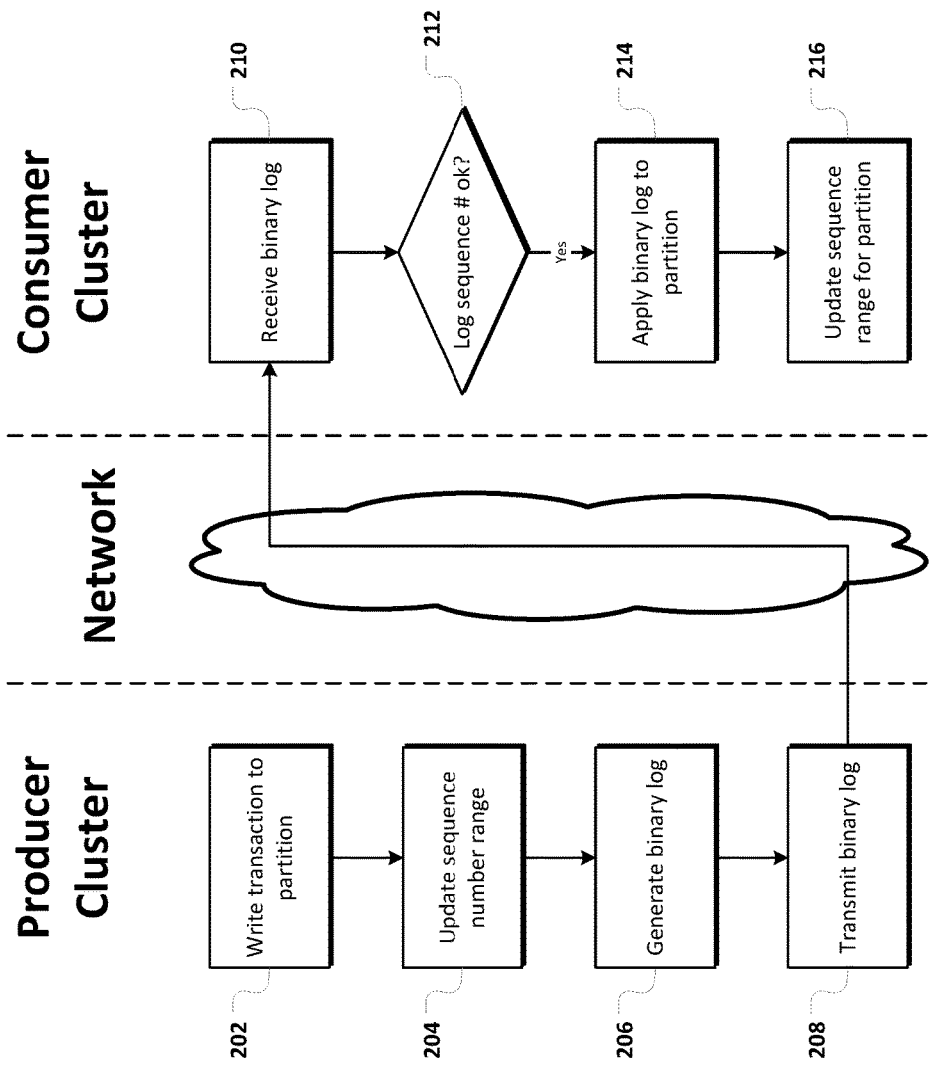
FIG. 2 depicts an example database replication process using sequence numbers in binary change logs.

FIG. 2 depicts one implementation of a DR technique using a sequence number tracker. In this implementation, each write transaction to database tables subject to DR results in the generation of a binary change log having an assigned sequence number. Starting from sequence number 0 (zero) for each partition upon the creation of a cluster, the assigned sequence number for a partition is a monotonically incremented on the writing of a binary change log for that partition. Thus, upon one or more write transactions to a partition (Step 202), the partition's sequence number is updated (incremented) (Step 204) in accordance with the generation of a binary log arising from the one or more write transactions (Step 206). The current sequence number for the partition can then be embedded in or otherwise combined or associated with the binary change log. For source identification purposes, the sequence number can be combined with (e.g., prepended with) a cluster and/or partition identifier value. The sequence number state for each partition can be persisted on a local storage medium and can be restored if needed upon the recovery of a database associated with the partition.

As further shown in FIG. 2, the producer cluster transmits the binary log (Step 208) to the consumer cluster, who receives the binary log (Step 210) and determines, based on the sequence number or number range recorded in the binary log, whether there are data changes that the consumer cluster has yet to apply to a partition (Step 212). More specifically, the consumer cluster can evaluate the binary log sequence number(s) against its stored sequence number tracker to ensure the data in the binary log is not duplicative of change data already stored by the data cluster, out of order, or otherwise not suitable to be processed. If the sequence number or range (or a portion thereof) includes data not yet applied to the consumer cluster partition, the changes recorded in the binary log can be applied to the partition (Step 214), and the sequence range tracked by the consumer cluster can be updated based on the applied changes (Step 216), as further described below.

Changes replicated from one cluster (e.g., a producer cluster having one or more producer partitions) to another cluster (e.g., a consumer cluster having one or more consumer partitions) are applied in transactions referred to herein as "ApplyBinaryLog" transactions. Each ApplyBinaryLog transaction generated for a consumer partition can cover a consecutive range of DR sequence numbers, and each partition on the consumer cluster tracks the sequence numbers associated with binary change logs that it has successfully applied. In some implementations, depending on the topology (e.g., total partition count and data layout) of the consumer cluster, binary change logs may or may not be combined into a single ApplyBinaryLog transaction going to the same consumer partition. The consumer cluster can persist the sequence numbers to a storage medium for recovery, if ever needed.

In one implementation, the sequence numbers for binary change logs that have been successfully applied are stored as a map of range sets. The keys of the map are the producer partition identifiers, and the ranges refer to successfully applied DR sequence number ranges from that producer partition. For example, if a consumer partition has applied binary change logs from producer partition 015 having sequence numbers 1, 2, 3 and 4, the map will store key: 015, value: [1, 4]. Similarly, if sequence numbers 1, 5, 6, 7, 8, 12, and 13 have been applied, the map will store key: 015, value: [1], [5, 8], [12, 13]. The use of ranges in a DR system ensures that ApplyBinaryLog transactions are executed in order without any gaps.

In another implementation, if a consumer cluster has applied a consecutive number of binary logs starting from the first binary log (having sequence number 0), the stored range does not specify 0 as the starting range number. Instead, to represent that the consumer cluster has applied all binary logs from the earliest created to a particular sequence number N, the range [N, N] can be stored. In other words, if the consumer cluster has applied binary change logs 0 to 10 for a particular partition, the range [10, 10] is stored by the consumer cluster for that partition. On the other hand, if the consumer cluster has successfully applied sequence numbers 0 to 10 and 12 to 15, the stored ranges include [10, 10] and [12, 15]. In the event the consumer cluster fails and recovers, it can request binary logs following sequence number 10 from the producer cluster in order to apply the missing binary log with sequence number of 11.

In some instances, multiple, non-contiguous ranges occur only in the case of different topologies between producer and consumer clusters. When the topology between the two is the same, there is only one stored range, as binary log streams are configured to be applied in sequence from a given producer partition to a given consumer partition.

Advantageously, the sequence number range approach allows for fast inclusion check by a computing system. That is, if a partition stores applied ranges [1, 20] and [31, 50], the operation to determine that the DR sequence number 10 has been applied and sequence number 25 has not been applied is fast and efficient, compared to database replication computing systems that must evaluate whether stored data or lengthy transaction logs to determine whether certain binary change logs were applied. Further, the ranges can be stored in numerical order for even faster lookups. Another advantage is that ranges are relatively small when applied binary change log sequence numbers are consecutive. If sequence numbers 1 to 20 have been successfully applied to a partition, and another range of sequence numbers 21 to 50 is later successfully applied, the partition need only track the range [1, 50]. Similarly, ranges can be merged. For instance, if one partition stores the ranges [1,10] and [21, 50], and another partition stores the range [11, 20], the ranges can be merged to form range [1,50].

Figure 3:
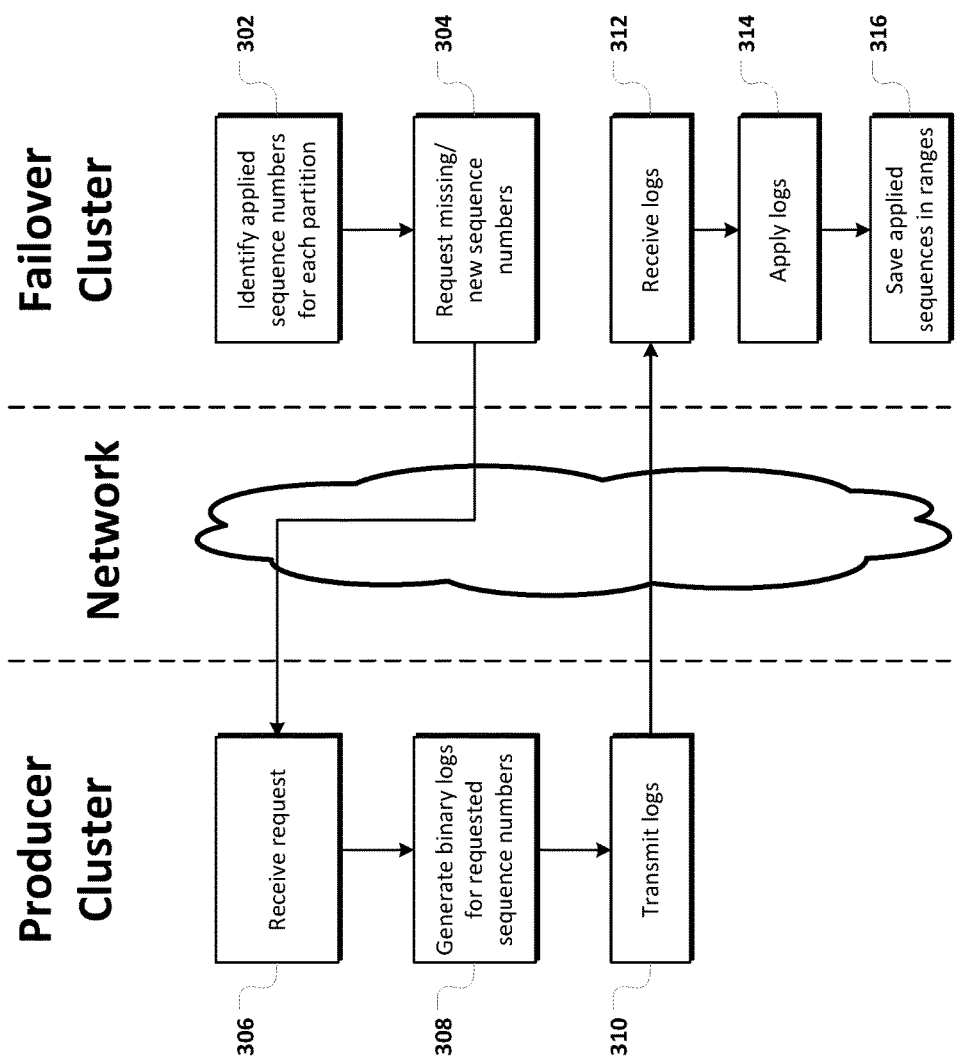
FIG. 3 depicts an example database recovery process using sequence numbers in binary change logs.

In another implementation, and referring now to FIG. 3, the sequence number range techniques described herein provide for DR fault tolerance. Specifically, on the failure of a particular node, a failover node can retrieve the stored sequence number ranges from all partitions in the failover node to determine which sequence numbers for binary change logs have not yet been applied (Step 302). The failover node can then request from a producer cluster missing binary logs and/or new binary logs created by the producer cluster from that point in time forward (Step 304). In response to receiving the request (Step 306), the producer cluster generates the binary logs corresponding to the requested sequence numbers (Step 308) and transmits them to the failover node (Step 310), who receives the binary logs, applies them to the partition(s), and updates the stored sequence number ranges at the consumer cluster (Steps 312-316).

Sequence numbers can also be used to detect duplicates, ensuring that ApplyBinaryLog transactions are idempotent. The sequence number ranges tracked for each partition provide an indication of not only what the last applied binary log was, but also what binary logs have been applied from the beginning of time for that partition.

In some implementations, the present DR techniques are agnostic to cluster topology. That is, using the DR sequence number tracking as discussed above, different cluster topologies between producer and consumer clusters are supported. If, for instance, a consumer cluster has a different topology (different partition count) than a producer cluster, a transaction might be routed to a different consumer partition rather than a partition corresponding to the producer partition. In other words, a producer partition's replication stream may be split into several streams on the consumer cluster. Because successfully applied DR sequence numbers of each producer partition are persisted as ranges on each consumer partition, these ranges can be collected from the consumer partitions and merged together to determine which DR sequence number ranges are missing for a given producer partition (e.g., on node failures or cluster recovery).

In another implementation, the present system provides for replication of globally distributed transactions. When a distributed transaction (MP transaction) is committed on a producer cluster, each producer partition generates a work unit that contains a unique identifier of the transaction and its binary change log, and inserts the work unit into a binary change log stream associated with the producer partition. The work unit is ordered with respect to the single partition transactions performed on the same partition. Upon receiving the work unit on the consumer cluster, the work unit is sent to a global coordinator and the producer partition's stream is paused. The coordinator waits for work units of the same MP transaction from all producer partitions, then it concatenates the binary change logs together and initiates a single MP transaction on the consumer cluster to apply all of the changes transactionally.

As described above, sequence number tracking is done at the partition level. For MP transactions, each work unit includes the sequence number from its originating producer partition. The MP coordinator aggregates the sequence numbers from all work units when it initiates the MP transaction on the consumer cluster. This differs from the case of a single partition transaction, where there is only one sequence number.

Fault tolerance for MP transactions works similarly as compared to single partition transactions. Failover nodes collect the DR sequence number ranges from all partitions and request retransmission of missing and/or new binary logs from the producer cluster. MP work units are resent to the coordinator if the transaction was not executed.

In one implementation, the present system provides conflict reporting and automatic resolution for XDCR, in which both database clusters are writable. When using XDCR, it is possible to encounter conflict situations in which the same data (e.g., a tuple) is changed in both clusters at the same or close points in time. When the clusters later receive change logs from each other, conflicts occur on account of the simultaneous modifications. These conflicts can be automatically written to an export table log stored at a location configurable by a user (e.g., written to disk, Kafka, JDBC, etc.).

The DR system can also resolve certain types of conflicts automatically to achieve cluster consistency. One example technique for conflict resolution is as follows. If the underlying Structured Query Language (SQL) table has a primary key defined, the DR system treats the primary key as a unique identifier of a tuple. When two tuples with the same primary key are inserted simultaneously on two clusters or when the same tuple is being modified (on the non-primary key columns) simultaneously on two clusters, the one with a later timestamp (with microsecond precision) is used when the conflict is detected. If the same tuple is deleted on one cluster and modified on the other cluster simultaneously, the tuple is deleted on both clusters when the conflict is detected. These two resolutions guarantee that the clusters will eventually reach a consistent state after detecting the conflicts.

In one implementation, the DR system includes at least one computer or a networked collection of computers having one or more associated data stores. A particular data store can be, for example, a relational or other structured database based on technological implementations including Oracle® MySQL, Oracle® Database, Microsoft® SQL Server, PostgreSQL, or IBM DB2. In other implementations, the DR system includes one or more virtualized computing units running in a cloud-computing platform.

More generally, implementations of the system can use appropriate hardware or software. Computers used in the system can run server-class operating systems such as the Microsoft Windows® operating systems, the Linux® operating system and other variants of UNIX® operating systems, Oracle® Solaris®, and the like. Software can be implemented on a general purpose computing device in the form of a computer including a processing unit, a system memory, and a system bus that couples various system components including the system memory to the processing unit.

Software executed by the system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application implemented in a suitable programming language or framework.

Method steps of the techniques described herein can be performed by one or more programmable processors executing one or more computer programs to perform functions by operating on input data and generating output. Method steps can also be performed by, and systems can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor receives instructions for execution and data from a read-only memory or a random access memory or both. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

A communications network can facilitate communication among clusters and clients in the DR system. The communication can take place over media such as standard telephone lines, LAN or WAN links (e.g., T1, T3, 56 kb, X.25), broadband connections (ISDN, Frame Relay, ATM), and wireless links (802.11 (Wi-Fi), Bluetooth, GSM, CDMA, etc.), for example. The network can carry TCP/IP protocol messages communicated over such TCP/IP networks, although other communication protocols are contemplated.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A non-transitory computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

The invention claimed is:

1. A method of performing database replication, the method comprising:
   generating, at a producer cluster, a binary change log based on a write transaction made to a database partition in the producer cluster;
   including with the binary change log a sequence number corresponding to the write transaction;
   transmitting the binary change log from the producer cluster to a consumer cluster;
   determining, at the consumer cluster, whether to apply the binary change log based on the sequence number included with the binary change log;
   applying the binary change log to a database partition in the consumer cluster; and
   storing, at the consumer cluster, the sequence number by combining the sequence number with a numerical range comprising a first number and a second number, the second number comprising a value corresponding to a most recent binary change log applied to the database partition in the consumer cluster, wherein combining the sequence number with the numerical range comprises:
   determining that the sequence number consecutively follows the second number, and replacing the second number with the sequence number; or
   determining that the sequence number does not consecutively follow the second number, and storing at the consumer cluster a second numerical range comprising the sequence number.

2. The method of claim 1, wherein including with the binary change log a sequence number corresponding to the write transaction comprises increasing a previous sequence number associated with the database partition in the producer cluster.

3. The method of claim 1, wherein determining whether to apply the binary change log comprises determining, based on the sequence number included with the binary change log, whether the binary change log has already been applied to the database partition in the consumer cluster.

4. The method of claim 1, wherein the first number comprises a value corresponding to an earliest binary change log applied to the database partition in the consumer cluster.

5. The method of claim 1, wherein the first number comprises a value indicating that all binary change logs, from an earliest binary change log created for the database partition in the producer cluster to the most recent binary change log, have been applied to the database partition in the consumer cluster.

6. The method of claim 1, further comprising:
   receiving, for each database partition in a plurality of database partitions in the consumer cluster, a numerical range of sequence numbers representing binary change logs applied to the respective database partition;
   determining, based on the received numerical ranges, which binary change logs were applied to the consumer cluster; and
   sending a request to the producer cluster, by the consumer cluster, for one or more binary change logs that were not applied to one or more database partitions in the consumer cluster.

7. The method of claim 1, wherein the producer cluster comprises a first topology and the consumer cluster comprises a second, different topology, the method further comprising:
   receiving, at the consumer cluster, a plurality of binary change logs associated with a first database partition in the producer cluster, each of the binary change logs including a different sequence number;
   applying the plurality of binary change logs to a plurality of database partitions in the consumer cluster; and
   for each applied binary change log, storing, at the consumer cluster, the sequence number for that binary change log in a respective numerical range associated with the database partition in the consumer cluster to which that binary change log was applied.

8. The method of claim 7, further comprising:
   receiving the numerical ranges associated with the database partitions in the consumer cluster;
   merging the numerical ranges to form at least one merged numerical range representing the plurality of binary change logs applied to the database partitions; and
   identifying, based on the at least one merged numerical range, which sequence numbers and corresponding binary logs are missing with respect to the first database partition in the producer cluster.

9. A system for performing database replication, the system comprising:
   at least one memory for storing computer-executable instructions; and
   at least one processor for executing the instructions stored on the at least one memory, wherein execution of the instructions programs the at least one processor to perform operations comprising:
      generating, at a producer cluster, a binary change log based on a write transaction made to a database partition in the producer cluster;
      including with the binary change log a sequence number corresponding to the write transaction;
      transmitting the binary change log from the producer cluster to a consumer cluster;
      determining, at the consumer cluster, whether to apply the binary change log based on the sequence number included with the binary change log;
      applying the binary change log to a database partition in the consumer cluster; and
      storing, at the consumer cluster, the sequence number by combining the sequence number with a numerical range comprising a first number and a second number, the second number comprising a value corresponding to a most recent binary change log applied to the database partition in the consumer cluster, wherein combining the sequence number with the numerical range comprises:
         determining that the sequence number consecutively follows the second number, and replacing the second number with the sequence number; or
         determining that the sequence number does not consecutively follow the second number, and storing at the consumer cluster a second numerical range comprising the sequence number.

10. The system of claim 9, wherein including with the binary change log a sequence number corresponding to the write transaction comprises increasing a previous sequence number associated with the database partition in the producer cluster.

11. The system of claim 9, wherein determining whether to apply the binary change log comprises determining, based on the sequence number included with the binary change log, whether the binary change log has already been applied to the database partition in the consumer cluster.

12. The system of claim 9, wherein the first number comprises a value corresponding to an earliest binary change log applied to the database partition in the consumer cluster.

13. The system of claim 9, wherein the first number comprises a value indicating that all binary change logs, from an earliest binary change log created for the database partition in the producer cluster to the most recent binary change log, have been applied to the database partition in the consumer cluster.

14. The system of claim 9, wherein the operations further comprise:
   receiving, for each database partition in a plurality of database partitions in the consumer cluster, a numerical range of sequence numbers representing binary change logs applied to the respective database partition;
   determining, based on the received numerical ranges, which binary change logs were applied to the consumer cluster; and
   sending a request to the producer cluster, by the consumer cluster, for one or more binary change logs that were not applied to one or more database partitions in the consumer cluster.

15. The system of claim 9, wherein the producer cluster comprises a first topology and the consumer cluster comprises a second, different topology, and wherein the operations further comprise:

receiving, at the consumer cluster, a plurality of binary change logs associated with a first database partition in the producer cluster, each of the binary change logs including a different sequence number;

applying the plurality of binary change logs to a plurality of database partitions in the consumer cluster; and for each applied binary change log, storing, at the consumer cluster, the sequence number for that binary change log in a respective numerical range associated with the database partition in the consumer cluster to which that binary change log was applied.

16. The system of claim 15, wherein the operations further comprise:

receiving the numerical ranges associated with the database partitions in the consumer cluster;

merging the numerical ranges to form at least one merged numerical range representing the plurality of binary change logs applied to the database partitions; and identifying, based on the at least one merged numerical range, which sequence numbers and corresponding binary logs are missing with respect to the first database partition in the producer cluster.

\* \* \* \* \*